(12) United States Patent
Lee et al.

(10) Patent No.: US 10,437,098 B2
(45) Date of Patent: Oct. 8, 2019

(54) REFLECTIVE DISPLAY APPARATUS

(71) Applicant: Coretronic Corporation, Hsin-Chu (TW)

(72) Inventors: Hsin-Hung Lee, Hsin-Chu (TW); Yi-Yu Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/177,475

(22) Filed: Nov. 1, 2018

(65) Prior Publication Data
US 2019/0137798 A1 May 9, 2019

(30) Foreign Application Priority Data

Nov. 9, 2017 (TW) .............................. 106216650 A (51) Int. Cl.
*G02F 1/13357* (2006.01)
*F21V 8/00* (2006.01)
*G02F 1/1335* (2006.01)

(52) U.S. Cl.
CPC ......... *G02F 1/1336* (2013.01); *G02B 6/0035* (2013.01); *G02F 1/133512* (2013.01); *G02B 6/0036* (2013.01); *G02B 6/0043* (2013.01); *G02F 2001/133616* (2013.01); *G02F 2203/02* (2013.01)

(58) Field of Classification Search
CPC ............. G02F 1/133512; G02F 1/1336; G02F 2001/133616; G02F 2203/02; G02B 6/0035; G02B 6/0036; G02B 6/0043
See application file for complete search history.

(56) References Cited

U.S. PATENT DOCUMENTS

| 2008/0170172 A1* | 7/2008 | Okuda .............. G02F 1/133512 349/59 |
| 2012/0257409 A1 | 10/2012 | Huang et al. |
| 2015/0070327 A1* | 3/2015 | Hsieh .................... G06F 3/0421 345/175 |
| 2015/0233552 A1* | 8/2015 | Callens ............... B32B 37/0076 362/97.1 |

(Continued)

FOREIGN PATENT DOCUMENTS

| EP | 1197788 A1 * | 4/2002 | ....... G02F 1/133615 |
| TW | 201510823 | 3/2015 | |

(Continued)

*Primary Examiner* — Alan B Cariaso
(74) *Attorney, Agent, or Firm* — JCIPRNET (57) ABSTRACT

A reflective display apparatus includes an LGP, at least one light-emitting element, a reflective display panel, a first light-absorbing portion, and a first gel layer. The light-emitting element is beside a light-incident surface of the LGP. The LGP has a first region and a second region. The first region is between the light-emitting element and the second region. The reflective display panel is under a bottom surface of the LGP. The first light-absorbing portion is at a side of one of a bottom surface and a top surface of the LGP. The first gel layer is between the first light-absorbing portion and the LGP. The light-absorbing portion is in the first region. A display region of the reflective display panel is in the second region. In the first region, the bottom surface or the top surface where the first light-absorbing portion is disposed is a plane surface.

10 Claims, 5 Drawing Sheets

(56) References Cited

U.S. PATENT DOCUMENTS

2016/0187713 A1\*  6/2016  Jung ................. G02F 1/133308
                                                    349/58
2017/0082850 A1\*  3/2017  Shim ...................... G02B 26/04
2017/0123144 A1\*  5/2017  Baek ...................... G02B 6/005

FOREIGN PATENT DOCUMENTS

TW          1507783        11/2015
TW          1533040         5/2016

\* cited by examiner

REFLECTIVE DISPLAY APPARATUS

CROSS-REFERENCE TO RELATED APPLICATION

This application claims the priority benefit of Taiwan application serial no. 106216650, filed on Nov. 9, 2017. The entirety of the above-mentioned patent application is hereby incorporated by reference herein and made a part of this specification.

BACKGROUND

Field of the Invention

The invention relates to a display apparatus. More particularly, the invention relates to a reflective display apparatus.

Description of Related Art

A general front light display is formed by fully bonding a light guide plate and a display panel by a gel layer. The display principle of the general front light display is that when a light beam enters a light-incident surface of the light guide plate, the light beam undergoes a total internal reflection (TIR) in the light guide plate. Next, the total internal reflection of the light beam is interrupted by a plurality of micro-structures, and the light beam is transmitted to the display panel. The display panel then converts the light beam into an image beam, and the image beam is transmitted to a user after passing through the light guide plate. In the aforementioned structure, the light guide plate and the display panel are bonded via the gel layer. Since a difference between a refractive index of the light guide plate and a refractive index of the gel layer is very small, a portion of the light beam passes through the gel layer at a side of the light guide plate close to the light-incident surface and is transmitted to a portion of the display panel close to the light-incident surface, so the portion of the light beam does not undergo the total internal reflection in the light guide plate and is thus not transmitted to other portions of the display panel via the plurality of micro-structures. In other words, the amount of the light beam received by different portions of the display panel is not even; thereby, screen brightness of the front light display is not even (i.e., a bright band phenomenon) as well, and the resulting display quality is not satisfactory.

One way to solve said issue of the uneven brightness is to dispose a light-absorbing layer directly on the light guide plate close to the light-incident surface so as to absorb the light beam. However, in this case, the light beam which is able to undergo the total internal reflection in the light guide plate is also absorbed, resulting in a decrease in the screen brightness and a poor overall efficiency.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a reflective display apparatus capable of maintaining a good screen brightness and simultaneously having a good display quality.

Other goals and advantages described in one or more embodiments of the invention may be further understood by technical features broadly embodied and described as follows.

A reflective display apparatus provided in an embodiment of the invention includes a light guide plate, at least one light-emitting element, a reflective display panel, a first light-absorbing portion, and a first gel layer. The light guide plate has a bottom surface, a top surface, and a light-incident surface. The light-incident surface is connected to the bottom surface and the top surface, and the bottom surface is opposite to the top surface. The at least one light-emitting element is disposed beside the light-incident surface. The light guide plate further includes a first region and a second region, and the first region is located between the at least one light-emitting element and the second region. The reflective display panel is disposed under the bottom surface. The first light-absorbing portion is disposed at one of a side of the bottom surface and a side of the top surface of the light guide plate. The first gel layer is disposed between the first light-absorbing portion and the light guide plate. The first light-absorbing portion is located in the first region. A display region of the reflective display panel is located in the second region. In the first region, the bottom surface or the top surface where the first light-absorbing portion is disposed is a plane surface.

In an embodiment of the invention, the reflective display apparatus further includes a second light-absorbing portion and a second gel layer. The second light-absorbing portion is disposed at the other one of the side of the bottom surface and the side of the top surface of the light guide plate. The second light-absorbing portion is located in the first region. The top surface or the bottom surface where the second light-absorbing portion is disposed is a plane surface. The second gel layer is disposed between the second light-absorbing portion and the light guide plate. A refractive index of one of the first gel layer and the second gel layer located at the side of the top surface is greater than or equal to the refractive index of the other one of the first gel layer and the second gel layer located at the side of the bottom surface.

In an embodiment of the invention, the first light-absorbing portion is disposed at the side of the bottom surface, and the second light-absorbing portion is disposed at the side of the top surface.

In an embodiment of the invention, the first light-absorbing portion is located in the reflective display panel.

In an embodiment of the invention, the light guide plate further includes a plurality of optical micro-structures. The plurality of optical micro-structures are disposed on at least one of the bottom surface and the top surface of the light guide plate in the second region.

In an embodiment of the invention, the reflective display apparatus satisfies a following condition:

$$a \geq \frac{t}{2} \times \tan\left(\sin^{-1}\left(\frac{n'}{n}\right)\right),$$

wherein a is a width of the first light-absorbing portion, t is a thickness of the light guide plate, n' is a refractive index of the first gel layer, and n is a refractive index of the light guide plate.

In an embodiment of the invention, the reflective display panel further includes a black matrix. The black matrix is located in the first region, and the reflective display apparatus further satisfies a following condition:

$$a + b \geq \frac{t}{2} \times \tan\left(\sin^{-1}\left(\frac{n'}{n}\right)\right),$$

wherein b is a width of the black matrix.

In an embodiment of the invention, the reflective display apparatus satisfies following conditions:

$$a \geq \frac{t}{2} \times \tan\left(\sin^{-1}\left(\frac{n'}{n}\right)\right), \text{ and}$$

$$c \geq \frac{t}{2} \times \tan\left(\sin^{-1}\left(\frac{n''}{n}\right)\right),$$

wherein a is a width of the first light-absorbing portion, c is a width of the second light-absorbing portion, t is a thickness of the light guide plate, n' is a refractive index of the first gel layer, n" is a refractive index of the second gel layer, and n is a refractive index of the light guide plate.

In an embodiment of the invention, the reflective display panel further includes a black matrix. The black matrix is located in the first region, and the reflective display apparatus further satisfies a following condition:

$$a + b \geq \frac{t}{2} \times \tan\left(\sin^{-1}\left(\frac{n'}{n}\right)\right),$$

wherein b is a width of the black matrix.

In an embodiment of the invention, materials of the first gel layer and the second gel layer are different.

Based on the above, in the reflective display apparatus provided in one or more embodiments of the invention, the bright band phenomenon may be eliminated by disposing the light-absorbing portion at the side of the top surface or the side of the bottom surface of the light guide plate in the first region, thereby enabling the reflective display apparatus to have uniform brightness and good display quality. Besides, the bottom surface of the light guide plate where the light-absorbing portion is disposed in the first region is a plane surface, so that a display screen of the reflective display apparatus provided in one or more embodiments of the invention is able to maintain the good screen brightness.

Other objectives, features and advantages provided in one or more embodiments of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
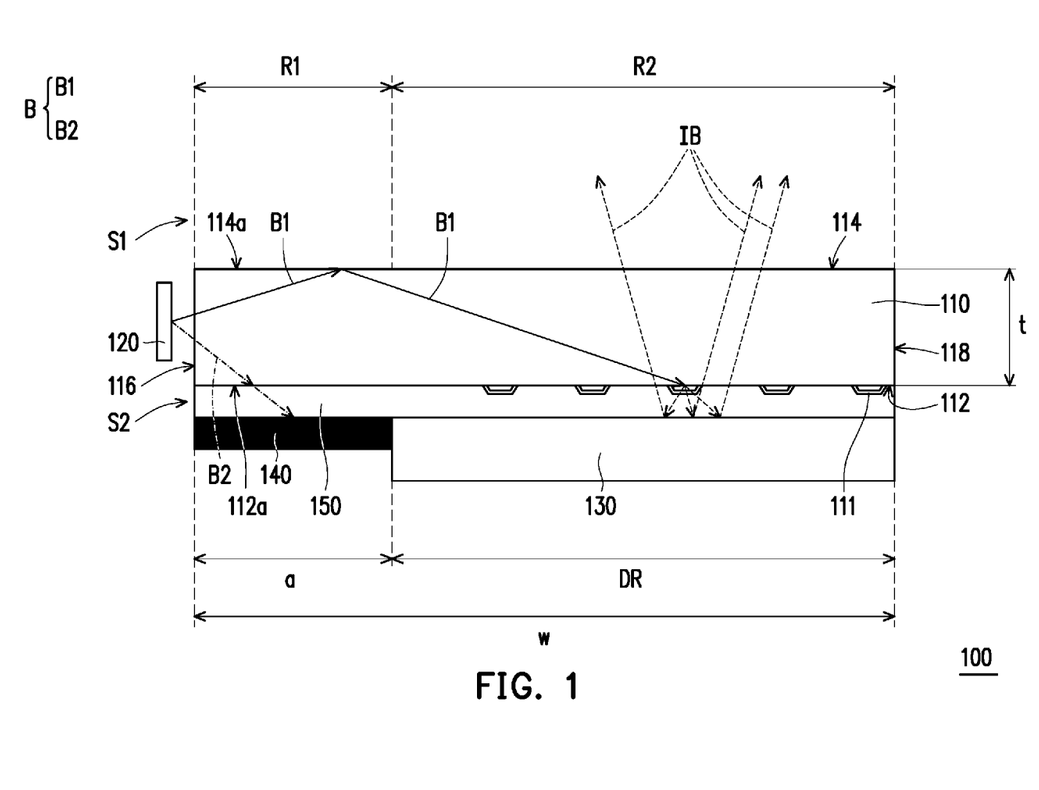
FIG. 1 is a schematic cross-sectional view of a reflective display apparatus according to an embodiment of the invention.

FIG. 1 is a schematic cross-sectional view of a reflective display apparatus according to an embodiment of the invention.

Referring to FIG. 1, a reflective display apparatus 100 of the embodiment includes a light guide plate (LGP) 110, a light-emitting element 120, a reflective display panel 130, a first light-absorbing portion 140, and a first gel layer 150. Each of the aforementioned elements will be explained in detail in following paragraphs.

The LGP 110 is an optical element that guides a transmitting direction of a light beam in the reflective display apparatus 100. The LGP 110 has a bottom surface 112, a top surface 114, a light-incident surface 116, and a side surface 118. The light-incident surface 116 is connected to the bottom surface 112 and the top surface 114. The bottom surface 112 is opposite to the top surface 114. The light-incident surface 116 is opposite to the side surface 118. In the embodiment, the LGP 110 further includes a first region R1 and a second region R2. In the embodiment, the LGP 110 further includes a plurality of optical micro-structures 111. The plurality of optical micro-structures 111 are formed on the bottom surface 112 of the LGP 110 corresponding to the second region R2. In an embodiment of the invention, the plurality of optical micro-structures 111 may also be formed on the top surface 114 of the LGP 110 corresponding to the second region R2. In another embodiment of the invention, the plurality of optical micro-structures 111 may also be simultaneously formed on the bottom surface 112 and the top surface 114 of the LGP 110 corresponding to the second region R2; the invention is not limited thereto. The plurality of optical micro-structures 111 may be formed via, for example, an inkjet process, an injection process, a hot rolling process, etc.; the invention is not limited thereto. In the embodiment, a material of the LGP 110 may be polycarbonate (PC), polymethylmethacrylate (PMMA), glass, or a combination thereof; the invention is not limited thereto.

The light-emitting element 120 generally refers to an optical element having a light-emitting function. The light-emitting element 120 may be a light-emitting diode (LED), an organic light-emitting diode (OLED), a polymer light-emitting diode (PLED), a laser diode (LD), or other optical elements having the light-emitting function; the invention is not limited thereto. In the embodiment, the light-emitting element 120 is the LED.

The reflective display panel 130 is an image-providing element that reflects an applied light beam to generate an image beam. The reflective display panel 130 may be a reflective liquid crystal on silicon (LCOS) display panel or a reflective e-paper display panel; the invention is not limited thereto. In the embodiment, the reflective display panel 130 is the LCOS display panel.

The first light-absorbing portion 140 generally refers to an optical element having a light-absorbing function. A material of the first light-absorbing portion 140 may be polyethylene terephthalate (PET), dyed rubber, or dyed PET; the invention is not limited thereto. In the embodiment, the material of the first light-absorbing portion 140 is a black polyester film.

A material of the first gel layer 150 may be silicone, PMMA, or a combination thereof; the invention is not limited thereto. In the embodiment, the material of the first gel layer 150 is silicone.

Arrangement relationships among the aforementioned elements are explained in detail in following paragraphs.

Referring to FIG. 1, at least one light-emitting element 120 is disposed beside the light-incident surface 116 of the LGP 110. In FIG. 1, one light-emitting element 120 is exemplarily illustrated beside the light-incident surface 116. In other embodiments, a plurality of light-emitting elements 120 may be disposed beside the light-incident surface 116; the invention is not limited thereto. The first region R1 of the LGP 110 is located between the light-emitting element 120 and the second region R2 of the LGP 110. The first light-absorbing portion 140 is disposed at one of a side of the top surface 114 and a side of the bottom surface 112 of the LGP 110. In the embodiment, the first light-absorbing portion 140 is disposed at the side S2 of the bottom surface 112 of the LGP 110 and is located in the first region R1. The reflective display panel 130 is disposed under the bottom surface 112, and a display region DR of the reflective display panel 130 having a display function is located in the second region R2. The first gel layer 150 is disposed between the first light-absorbing portion 140 and the LGP 110 and is disposed between the reflective display panel 130 and the LGP 110. The first light-absorbing portion 140 and the reflective display panel 130 are bonded to the LGP 110 by the first gel layer 150. In the first region R1, the bottom surface 112 or the top surface 114 where the first light-absorbing portion 140 is disposed is a plane surface. As exemplarily shown in FIG. 1, the bottom surface 112 where the first light-absorbing portion 140 is disposed is a plane surface 112a.

In other embodiments, the first light-absorbing portion 140 may be disposed at the side S1 of the top surface 114 of the LGP 110; the invention is not limited thereto.

In the embodiment, in the first region R1, the top surface 114 where no first light-absorbing portion 140 is disposed is a plane surface 114a. However, in other embodiments, a plurality of micro-structures may be disposed at the top surface 114 where no first light-absorbing portion 140 is disposed, so as to adjust an optical path.

A propagating path of the light beam and optical effects in the reflective display apparatus 100 are explained in detail in following paragraphs.

When the light-emitting element 120 emits a light beam B, the light beam B enters the LGP 110 via the light-incident surface 116. Since refractive indexes of media (air and the first gel layer 150) at the two opposite sides S1 and S2 of the LGP 110 are both smaller than a refractive index of the LGP 110, after the light beam B enters the LGP 110, a portion of the light beam B1 whose incidence angle between interfaces of the LGP 110 and the two opposite sides S1 and S2 is greater than or equal to a critical angle of a total internal reflection in the LGP 110 is able to undergo one or a plurality of total internal reflections between the top surface 114 and the bottom surface 112 of the LGP 110. When the portion of the light beam B1 is transmitted to the plurality of optical micro-structures 111 located in the second region R2, the total internal reflection of the portion of the light beam B1 is interrupted by the plurality of optical micro-structures 111. The portion of the light beam B1 then passes through the first gel layer 150 and is transmitted to the reflective display panel 130. The reflective display panel 130 then reflects the portion of the light beam B1 to generate an image beam IB. Therefore, a user (not shown) may correspondingly see an image of the reflective display apparatus 100 in the second region R2. That is, the second region R2 is the display region of the reflective display apparatus 100. By contrast, since a light beam emitted from the first region R1 is not reflected by the reflective display panel 130, the first region R1 is a non-display region of the reflective display apparatus 100.

After the light beam B enters the LGP 110, since a portion of the light beam B2 whose incidence angle at the interfaces between the LGP 110 and the two opposite sides S1 and S2 is smaller than the critical angle of the total internal reflection in the LGP 110 cannot be transmitted via total internal reflection in the LGP 110, the portion of light beam B2 passes through the first gel layer 150 directly through the bottom surface 112 and is absorbed by the first light-absorbing portion 140 in the first region R1.

Based on the above, in the reflective display apparatus 100 of the embodiment, a bright band phenomenon derived from the light beam B2 may be eliminated by disposing the first light-absorbing portion 140 in the first region R1 between the light-emitting element 120 and the second region R2. Therefore, the image brightness of the reflective display apparatus 100 is uniform, and the reflective display apparatus has good display quality according to the embodiment. According to the Snell's Law, the light beam B2 cannot be transmitted to the reflective display panel 130 via total internal reflection. In other words, the light beam B2 cannot be provided to the reflective display panel 130 naturally. Therefore, even if the first light-absorbing portion 140 absorbs the portion of light beam B2, the efficiency of the reflective display apparatus 100 is not degraded.

In addition, since the first gel layer 150 is disposed between the first light-absorbing portion 140 and the LGP 110, the light beam B1 is able to undergo total internal reflection between the bottom surface 112 and the top surface 114 without passing through the first gel layer 150 and without being absorbed by the first light-absorbing portion 140. Moreover, the bottom surface 112 where the first light-absorbing portion 140 is disposed in the first region R1 is the plane surface 112a; hence, instead of being scattered by the bottom surface 112 in any other shape in the first region R1 and then being transmitted to the first absorbing portion 140, the portion of the light beam B1 may smoothly undergo the total internal reflection in the LGP 110. As a result, the portion of the light beam B1 may be successfully transmitted to the reflective display panel 130 so that an image displayed on the reflective display panel 130 may consistently have sufficient brightness.

In addition, in the embodiment, the reflective display apparatus 100 satisfies the following condition:

$$a \geq \frac{t}{2} \times \tan\left(\sin^{-1}\left(\frac{n'}{n}\right)\right)$$

wherein a is a width of the first light-absorbing portion 140, t is a thickness of the LGP 110, n' is a refractive index of the first gel layer 150, and n is a refractive index of the LGP 110. For example, if the thickness t of the LGP 110 is 2 mm, the material of the light guide plate is PMMA (with the refractive index n of 1.49), and the material of the first gel layer is silicone (with the refractive index n' of 1.41), the width a of the first light-absorbing portion 140 should be at least greater than 2.9 mm. Said width design may ensure the light beam B2 to be completely absorbed by the first light-absorbing portion 140. Furthermore, the width a of the first light-absorbing portion 140 further satisfies the following condition:

$$\frac{w}{20} \geq a$$

wherein w is a width of the LGP 110.

Some contents in the aforementioned embodiment are also provided in following embodiments, in which repeated descriptions of identical technical contents are omitted. For elements with identical names, reference may be found in the aforementioned embodiment, and no repeated description of these elements is provided in the following embodiments.

Figure 2:
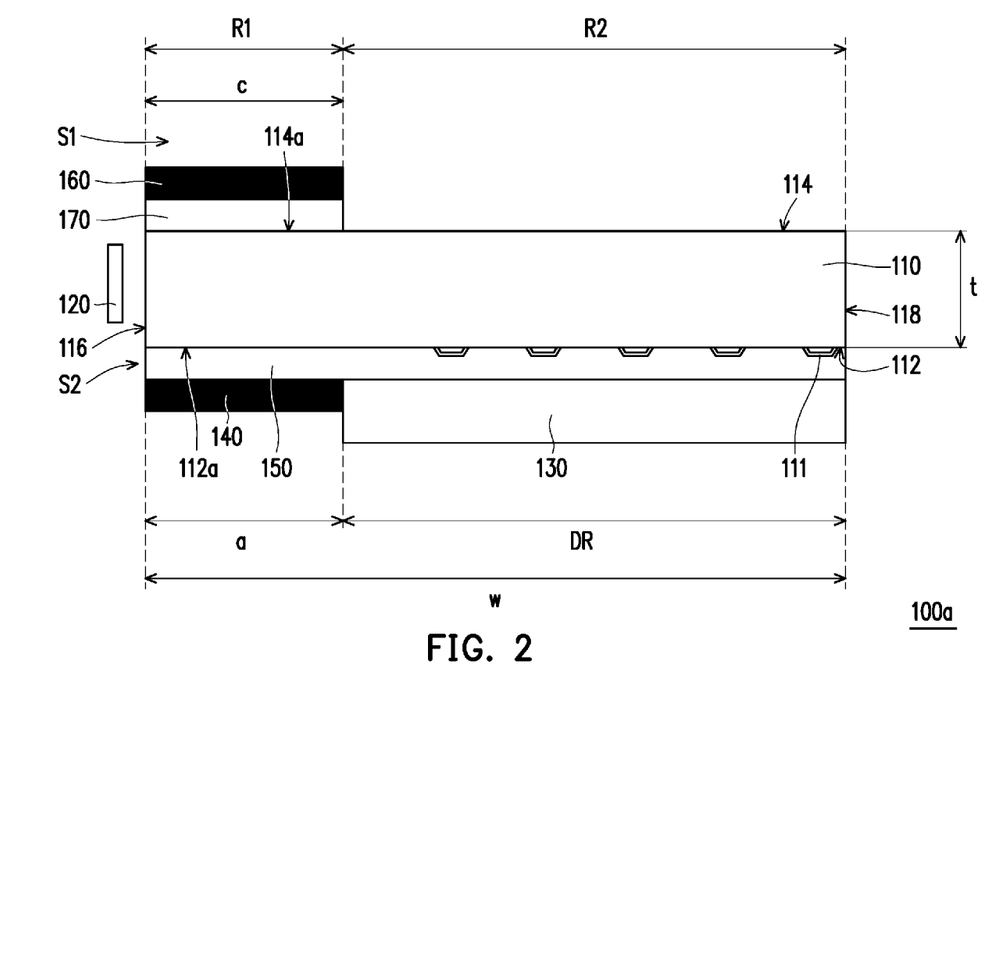
FIG. 2 is a schematic cross-sectional view of a reflective display apparatus according to another embodiment of the invention.

FIG. 2 is a schematic cross-sectional view of a reflective display apparatus according to another embodiment of the invention.

A reflective display apparatus 100a shown in FIG. 2 is substantially similar to the reflective display apparatus 100 shown in FIG. 1, while the difference therebetween is as follows: the reflective display apparatus 100a further includes a second light-absorbing portion 160 and a second gel layer 170. A function and a material of the second light-absorbing portion 160 are similar to the function and the material of the first light-absorbing portion 140, and a function and a material of the second gel layer 170 are similar to the function and the material of the first gel layer 150, so relevant descriptions are not repeated herein. The second light-absorbing portion 160 is disposed at the other one of the side S1 of the top surface 114 and the side S2 of the bottom surface 112 of the LGP 110. Specifically, the second light-absorbing portion 160 is disposed at the side S1 of the top surface 114 of the LGP 110 and is located in the first region R1. The bottom surface 112 or the top surface 114 where the second light-absorbing portion 160 is disposed is a plane surface. As exemplarily shown in FIG. 2, the top surface 114 where the second light-absorbing portion 160 is disposed is a plane surface 114a. The second gel layer 170 is disposed between the second light-absorbing portion 160 and the LGP 110. A refractive index of one of the first gel layer 150 and the second gel layer 170 located at the side S1 of the top surface 114 is greater than or equal to the refractive index of the other one of the first gel layer 150 and the second gel layer 170 located at the side S2 of the bottom surface 112, and the materials of the first gel layer 150 and the second gel layer 170 may be identical or different. Specifically, in the embodiment, the first gel layer 150 is located at the side S2 of the bottom surface 112. The second gel layer 170 is located at the side S1 of the top surface 114. A refractive index n" of the second gel layer 170 is greater than the refractive index n' of the first gel layer 150, and the materials of the first gel layer 150 and the second gel layer 170 are different. Specifically, the material of the first gel layer 150 is silicone (with the refractive index of 1.41), and the material of the second gel layer 170 is PMMA (with the refractive index of 1.49). However, in other embodiments not shown, the refractive index of the first gel layer 150 is equal to the refractive index of the second gel layer 170, and the materials of the first gel layer 150 and the second gel layer 170 are identical. In addition, in the embodiment, a width c of the second light-absorbing portion 160 is equal to the width a of the first light-absorbing portion 140.

In the embodiment, the reflective display apparatus 100a further satisfies following conditions:

$$a \geq \frac{t}{2} \times \tan\left(\sin^{-1}\left(\frac{n'}{n}\right)\right), \text{ and}$$

$$c \geq \frac{t}{2} \times \tan\left(\sin^{-1}\left(\frac{n''}{n}\right)\right),$$

wherein c is the width of the second light-absorbing portion 160. Other parameters and functions are similar to those provided in the embodiment as shown in FIG. 1, so relevant descriptions are not repeated herein. In the embodiment, the width c of the second light-absorbing portion 160 is equal to the width a of the first light-absorbing portion 140.

In view of the foregoing, in the reflective display apparatus 100a provided in the embodiment, the capability of the reflective display apparatus 100a for eliminating a bright band phenomenon is more significant because not only the first light-absorbing portion 140 is disposed at the side S2 of the LGP 110 in the first region R1 but also the second light-absorbing portion 160 is disposed at the side S1 of the LGP 110 in the first region R1. In the reflective display apparatus 100a provided in the embodiment, a light leakage phenomenon may be avoided by designing the refractive index n″ of the second gel layer 170 to be greater than or equal to the refractive index n′ of the first gel layer 150.

Figure 3:
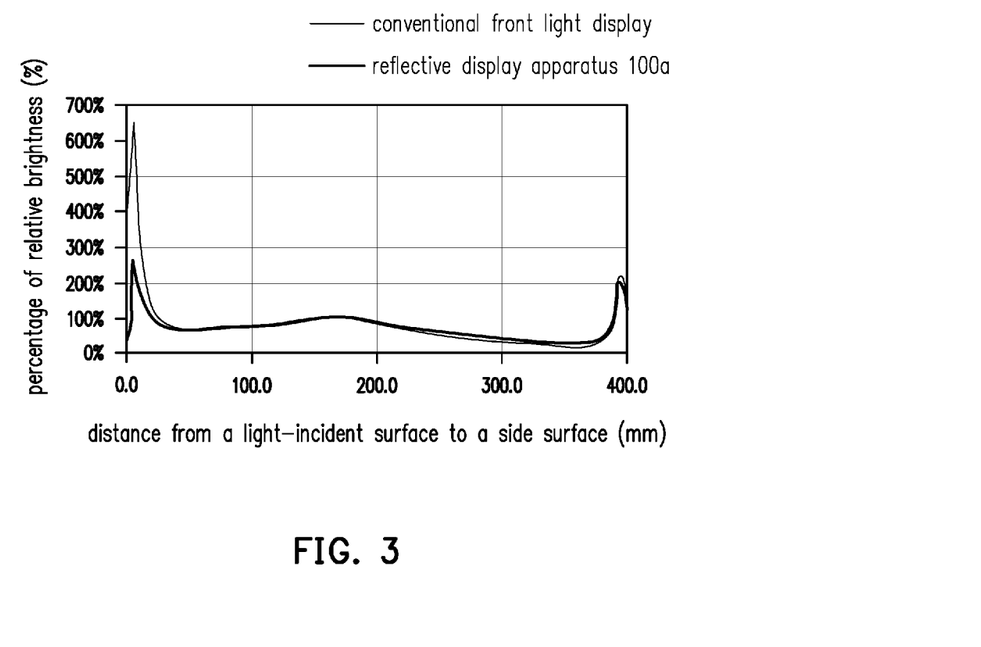
FIG. 3 is a diagram showing a brightness-distance relation of a conventional front light display and that of the reflective display apparatus in FIG. 2.

FIG. 3 is a diagram showing a brightness-distance relation of a conventional front light display and that of the reflective display apparatus in FIG. 2.

Referring to FIG. 3, a horizontal axis represents a distance from a light-incident surface to a side surface (in unit of mm). A vertical axis represents a percentage of relative brightness, wherein a central brightness of an image displayed by the reflective display apparatus 100a in the second region R2 is defined as 100%. Therefore, in the embodiment, FIG. 3 shows that the brightness in the vicinity region of the light-incident surface 116 of the reflective display apparatus 100a is significantly lower than the brightness in the vicinity of the light-incident surface of the conventional front light display.

Figure 4:
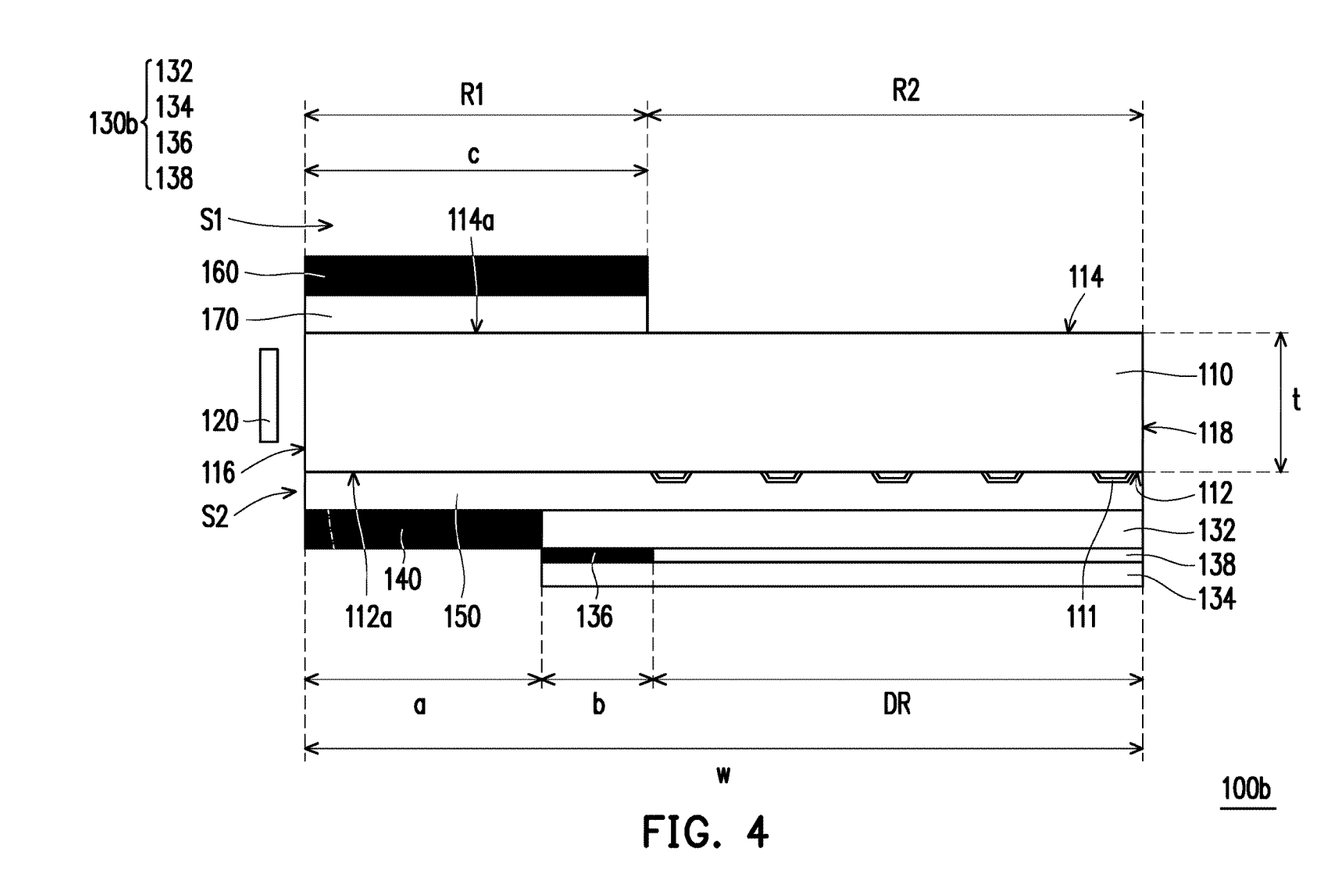
FIG. 4 is a schematic cross-sectional view of a reflective display apparatus according to another embodiment of the invention.

FIG. 4 is a schematic cross-sectional view of a reflective display apparatus according to another embodiment of the invention.

A reflective display apparatus 100b shown in FIG. 4 is substantially similar to the reflective display apparatus 100a shown in FIG. 2, while the difference therebetween is as follows: a reflective display panel 130b in the embodiment further includes an upper substrate 132, a lower substrate 134, a black matrix 136, and a display medium 138. The black matrix 136 and the display medium 138 are located between the upper substrate 132 and the lower substrate 134, and the black matrix 136 and the display medium 138 constitute one layer. The black matrix 136 may be configured to shield, for example, a scan driving circuit or other components of the reflective display apparatus 100b. In the embodiment, the black matrix 136 is located in the first region R1. Since the black matrix 136 of the reflective display panel 130b has a function of absorbing a light beam, the function of the black matrix 136 is similar to the aforementioned functions of the first light-absorbing portion 140 and the second light-absorbing portion 160. Therefore, in the embodiment, the first light-absorbing portion 140 and the black matrix 136 jointly absorb the light beam emitted from the bottom surface 112 of the LGP 110 in the first region R1.

In the embodiment, the reflective display apparatus 100b further satisfies the following condition:

$$a + b \geq \frac{t}{2} \times \tan\left(\sin^{-1}\left(\frac{n'}{n}\right)\right),$$

wherein b is a width of the black matrix 136. Other parameters and functions are similar to those provided in the embodiment as shown in FIG. 1, so relevant descriptions are not repeated herein.

Figure 5:
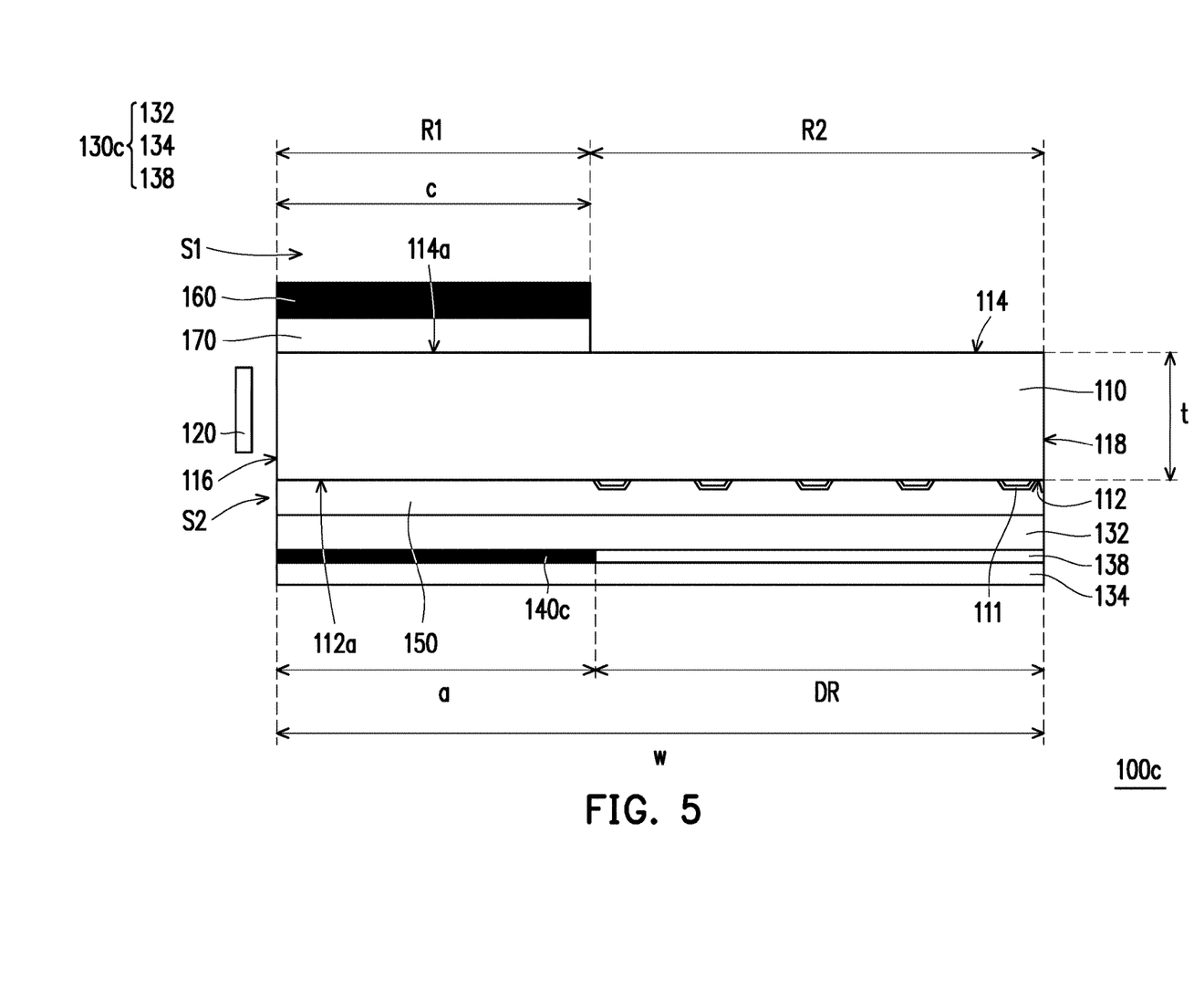
FIG. 5 is a schematic cross-sectional view of a reflective display apparatus according to another embodiment of the invention.

FIG. 5 is a schematic cross-sectional view of a reflective display apparatus according to another embodiment of the invention.

A reflective display apparatus 100c shown in FIG. 5 is substantially similar to the reflective display apparatus 100b shown in FIG. 4, while the difference therebetween lies in that a width of a reflective display panel 130c in the embodiment is identical to the width w of the LGP 110. A first light-absorbing portion 140c is located in the reflective display panel 130c and serves as a black matrix in the reflective display panel 130c, for instance.

To sum up, in the reflective display apparatus provided in one or more of the embodiments, the bright band phenomenon may be eliminated by disposing the light-absorbing portion at the side of the top surface or the side of the bottom surface of the LGP in the first region, thereby enabling the reflective display apparatus to have the uniform image brightness and good display quality. The light-absorbing portions may be disposed on the two opposite sides of the LGP in the first region, so as to better eliminate the bright band phenomenon. In addition, the bottom surface of the light guide plate where the light-absorbing portion is disposed in the first region is a plane surface, so that the light beam which is able to undergo the total internal reflection in the LGP may be successfully transmitted to the reflective display panel without being influenced by the shape of the bottom surface and thereby being scattered. Therefore, according to one or more embodiments, the image displayed on the reflective display panel is able to consistently have sufficient brightness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:
1. A reflective display apparatus, comprising:
a light guide plate, having a bottom surface, a top surface, and a light-incident surface, the light-incident surface being connected to the bottom surface and the top surface, and the bottom surface being opposite to the top surface;

at least one light-emitting element, disposed beside the light-incident surface, wherein the light guide plate further comprises a first region and a second region, and the first region is located between the at least one light-emitting element and the second region;

a reflective display panel, disposed under the bottom surface;

a first light-absorbing portion, disposed at one of a side of the bottom surface and a side of the top surface of the light guide plate; and a first gel layer, disposed between the first light-absorbing portion and the light guide plate, wherein the first light-absorbing portion is located in the first region, a display region of the reflective display panel is located in the second region, in the first region, the bottom surface or the top surface where the first light-absorbing portion is disposed is a plane surface.

2. The reflective display apparatus of claim 1, further comprising:

a second light-absorbing portion, disposed at the other one of the side of the bottom surface and the side of the top surface of the light guide plate, wherein the second light-absorbing portion is located in the first region, and the top surface or the bottom surface where the second light-absorbing portion is disposed is a plane surface; and a second gel layer, disposed between the second light-absorbing portion and the light guide plate, wherein a refractive index of one of the first gel layer and the second gel layer located at the side of the top surface is greater than or equal to the refractive index of the other one of the first gel layer and the second gel layer located at the side of the bottom surface.

3. The reflective display apparatus of claim 2, wherein the first light-absorbing portion is disposed at the side of the bottom surface, and the second light-absorbing portion is disposed at the side of the top surface.

4. The reflective display apparatus of claim 2, wherein the first light-absorbing portion is located in the reflective display panel.

5. The reflective display apparatus of claim 1, wherein the light guide plate further comprises a plurality of optical micro-structures, and the plurality of optical micro-structures are disposed on at least one of the bottom surface and the top surface of the light guide plate in the second region.

6. The reflective display apparatus of claim 1, wherein the reflective display apparatus satisfies a following condition:

$$a \geq \frac{t}{2} \times \tan\left(\sin^{-1}\left(\frac{n'}{n}\right)\right),$$

wherein a is a width of the first light-absorbing portion, t is a thickness of the light guide plate, n' is a refractive index of the first gel layer, and n is a refractive index of the light guide plate.

7. The reflective display apparatus of claim 6, wherein the reflective display panel further comprises a black matrix located in the first region, and the reflective display apparatus further satisfies a following condition:

$$a + b \geq \frac{t}{2} \times \tan\left(\sin^{-1}\left(\frac{n'}{n}\right)\right),$$

wherein b is a width of the black matrix.

8. The reflective display apparatus of claim 2, wherein the reflective display apparatus satisfies following conditions:

$$a \geq \frac{t}{2} \times \tan\left(\sin^{-1}\left(\frac{n'}{n}\right)\right), \text{ and}$$

$$c \geq \frac{t}{2} \times \tan\left(\sin^{-1}\left(\frac{n''}{n}\right)\right),$$

wherein a is a width of the first light-absorbing portion, c is a width of the second light-absorbing portion, t is a thickness of the light guide plate, n' is a refractive index of the first gel layer, n'' is a refractive index of the second gel layer, and n is a refractive index of the light guide plate.

9. The reflective display apparatus of claim 8, wherein the reflective display panel further comprises a black matrix located in the first region, and the reflective display apparatus further satisfies a following condition:

$$a + b \geq \frac{t}{2} \times \tan\left(\sin^{-1}\left(\frac{n'}{n}\right)\right),$$

wherein b is a width of the black matrix.

10. The reflective display apparatus of claim 2, wherein materials of the first gel layer and the second gel layer are different.

* * * * *